3,203,242
APPARATUS RESPONSIVE TO FLUID FLOW
Daniel Souriau, Paris, France, assignor to Service National dit: Gaz de France, Paris, France
Filed Mar. 16, 1962, Ser. No. 180,228
Claims priority, application France, Mar. 20, 1961, 856,096, Patent 1,258,913
4 Claims. (Cl. 73—231)

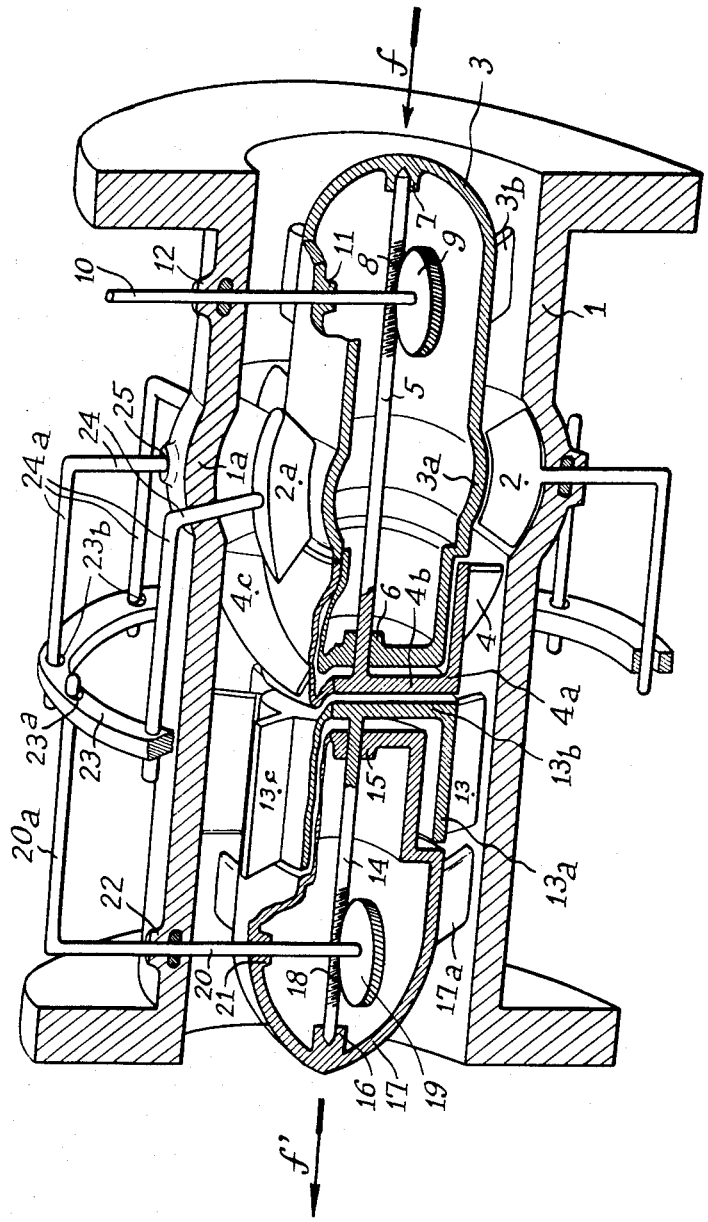

The present invention has for its object an improvement in the flow meter operating on the principle of maximum output of the measuring element, of the type described in copending application Serial Number 94,029 filed March 7, 1961, now Patent No. 3,142,179.

Such a meter comprises essentially a tubular casing limited internally by a generally cylindrical surface; in this casing, on the side where the fluid whose volume flow it is desired to measure enters, there is mounted a stabilizer with fixed helicoidal vanes, intended to impart to the fluid passing therethrough a rotational movement in a fixed direction, irrespective of the volume flow of this fluid, about a geometric axis corresponding to the general axis of the apparatus. A turbine, the shaft of which drives a revolution counter for the measurement of the flow of the fluid passing through the apparatus, is disposed behind the stabilizer, in the casing. Behind the turbine there is provided means for governing the turbine, comprising an element which senses the residual rotational velocity of the fluid at its emergence from the turbine. This element controls a retarding element which is intended to create a variable resistance force upon the turbine, in order to return this residual rotational velocity of the fluid at the exit of the turbine to a zero value and to keep it constantly at that value.

When the fluid issues from the turbine at a zero residual rotation velocity, the power taken up by the turbine at the expense of the fluid passing through it is maximum; under these conditions the output of the turbine, that is to say, the quotient of the power taken up on the shaft of the turbine over the initial power of the fluid by reason of the kinetic energy thereof at the entry of the said turbine, is a maximum. Under the conditions of maximum output of the turbine, the rotation speed thereof is proportional to the volume flow of the fluid passing through the meter, and the revolution counter driven by the shaft of the turbine can then integrate the flow of fluid in relation to time and indicate directly the volumes of fluid which have passed through.

In the form of embodiment as described in the copending application referred to above, so that the meter may function under the conditions of maximum output of the turbine, a governor device has been provided comprising as velocity-sensing element, a vaned member with plane radial blades, controlling an element for the magnetic braking of the turbine. This braking element comprises movable permanent magnets intended to create a variable braking force upon the turbine, the variation of this braking force being regulated by the movement of the magnets in relation to the turbine. This movement is controlled by the vaned member through the intermediary, of a system for transmission and transformation of movement, for example, of the worm and moving nut type.

The present invention has for its object improvements in the flow meter of this type, relating essentially to the governor device and permitting, among other advantages, of extending the ranges of the use of the meter to low flow quantities.

For this purpose, according to the present invention, in order to cause the meter to operate under conditions of maximum output of the turbine, the rotational speed of the latter is governed by modifying the rotational speed of the fluid at the entry of the turbine as a function of the residual rotational speed of the fluid at the exit from this turbine, in such fashion as to bring the residual rotational speed constantly to a zero value, without for this purpose varying the flow of the fluid passing through the meter.

According to the present invention, the stabilizer comprises movable blades which are orientable simultaneously, that is to say mounted in such fashion that they can pivot simultaneously through the same angle to modify the rotational speed of the fluid past the turbine. The angle of orientation of the blades is regulated by an element which detects the residual rotation speed of the fluid at the exit from the turbine, such an element comprising, for example a vaned member with plane radial vanes, which member actuates the said blades of the stabilizer through the intermediary of a control system of the type with pivoting levers, for example.

In this manner a modification of the angle of orientation of the blades of the stabilizer in the direction of an acceleration of the rotation of the fluid past the turbine causes an increase in the drive force and/or in the rotational speed of the turbine. On the other hand, a modification of the angle of orientation of the blades of the stabilizer in the direction of a retardation of the rotation of the fluid past the turbine produces the opposite effect, that is to say, a reduction of the drive force and/or of the rotational speed of the turbine. The velocity-sensing element orientates the blades of the stabilizer, through the intermediary of the control system, in the direction tending to reduce the residual rotation velocity of the fluid at the exit of the turbine, in order to bring it to a zero value and maintain it constantly at that value.

The invention will be better understood by reference to the following description of a preferred embodiment of the improved meter according to the present invention, given with reference to the accompanying drawing which shows a perspective view of the said meter in longitudinal section.

As represented in the drawing, the improved meter according to the present invention comprises essentially a generally cylindrical casing 1, inside which there is mounted a stabilizer 2 with movable blades 2a mounted pivotally between the casing 1 and a central casing 3, in alignment with the expanded portions 1a, 3a which are provided to permit the movement of the said blades. The central casing 3 is kept in place by lugs 3b welded to the internal wall of the casing 1. Operationally behind the stabilizer there is placed a pure action axial turbine 4, composed of a hub 4a, end piece 4b and vanes 4c carried by the said hub and filling all the free space between hub 4a and the casing 1, except for the usual mechanical clearance. The shaft 5 of the turbine rotates in two bearings 6, 7 provided respectively in the rear wall and in the front wall of the casing 3. Shaft 5 through the agency of a system comprising worm 8 and toothed wheel 9, drives the shaft 10 of a revolution counter (not shown) which rotates in the bearings 11, 12 carried respectively by the casing 3 and by the casing 1. The governor means comprises a vaned member 13 composed of a hub 13a, an end wall 13b and plane radial vanes 13c, serving as means sensitive to the speed of rotation of the fluid at emergence from the turbine 4. Shaft 14 of the vaned member rotates in bearings 15, 16 provided respectively in the front wall and in the rear wall of a casing 17 which is held in place by lugs 17a welded to the internal wall of the casing 1; this shaft carries a worm 18 driving a toothed wheel 19 keyed on an angled lever 20 pivoting in two bearings 21, 22 carried respectively by the casing 17 and the casing 1. The free end 20a of the lever 20 passes through a ring 23 via a hole 23a and through the agency of ring 23 controls a set of angled levers 24, pivotally mounted in bearings 25 carried by the casing 1, which serve as pivots for the blades 2a of the stabilizer 2. The free ends 24a of levers pass through the ring 23 by means of the holes 23b.

In operation, the fluid whose volume flow it is desired to measure passes through the casing 1 in the direction indicated by the arrows f, f' and is orientated by the stabilizer 2 which imparts a rotational movement to the fluid. The orientated fluid is deviated from its path by the turbine 4 which thus absorbs significant power at the expense of this fluid. The power taken up by turbine 4 is a maximum when the fluid issues from turbine 4 at a zero rotational speed, that is to say that it issues from the turbine 4 in currents parallel with the axis of the meter. In this case the vaned member 13 remains stationary as it receives no thrust. The meter then operates under conditions of maximum output of the turbine 4, and the speed of rotation thereof is proportional to the speed of rotation of the fluid at the exit from the stabilizer 2. The revolution counter can then integrate the flow of fluid in relation to time and indicate directly the volumes of fluid which have passed through.

In the other case when the output of the turbine 4 is not a maximum, the fluid issuing from the turbine 4 will still have a certain rotational component of speed and it will impart a rotation in the same direction as its own to the vaned member 13. The latter will pivot the lever 20 in the corresponding direction, thus causing rotation of the ring 23 and consequently pivoting of the levers 24 connected to this ring. The blades 2a of the stabilizer 2 are simultaneously pivoted by the same angle, thus varying the speed of rotation of the fluid at the entry to the turbine 4 and thus the rotational speed of this turbine, in the direction to bring the residual rotational speed of the fluid at the exit of turbine 4 to a zero value. The meter then operates under the conditions of maximum output of the turbine.

By reason of the above described improvement the construction of the meter is simplified, since it has been possible to omit the entire braking device provided in copending application referred to above.

Furthermore the ranges of use of the meter improved in this manner are widened, especially in the regions of low flow quantities, due to the fact that the orientation of the blades permits the regulation of the passage section in order to retain a suitable speed in the fluid issuing from the stabilizer so that it may act upon the turbine.

It is understood that the invention is not limited to the precise details of the above description which are given solely by way of example, and that it is possible to effect various modifications therein without however departing from the scope of the present invention. For example it is possible to replace the pure action axial turbine by a turbine of any type, for example by a radial turbine, a Pelton turbine, etc.

What I claim is:

1. A volume flow meter for measuring fluid flow comprising a tubular casing having an internal cylindrical surface, a stabilizer disposed within said tubular casing, said stabilizer having movable helicoidal blades for imparting to the fluid passing therethrough a rotational movement with respect to the major axis of said flow meter, a measuring means comprising a turbine mounted operationally behind said stabilizer, said turbine having a shaft adapted to be coupled to registering means for the recording of the volume flow of the fluid passing through said meter, a regulating means comprising a velocity-sensing element disposed operationally behind said turbine and mounted for free rotation about said major axis of said flow meter under the action of the residual rotational movement of the fluid issuing from said turbine, and mechanical actuating means consisting of a mechanical linkage connected between said velocity-sensing element and said helicoidal blades for directly converting the rotation of said element into a motion which changes the angle of orientation of said blades in a direction which tends to reduce to zero the residual rotational speed of the fluid issuing from said turbine.

2. A volume flow meter as claimed in claim 1 wherein the helicoidal blades of said stabilizer are simultaneously orientable.

3. The volume flow meter of claim 1 wherein said velocity-sensing element includes flat planar vanes radially extending from a shaft disposed along the major axis of said meter.

4. The volume flow meter of claim 2 wherein said helicoidal blades are pivotable and said mechanical linkage comprises first angled lever means pivotably driven by the shaft of said velocity-sensing element, a ring means disposed about said tubular casing, and free to rotate about said casing, means for connecting first angled lever means to said ring means whereby, as said first angled lever means is pivoted, said ring means rotates, second angled lever means connected to said helicoidal blades, and means for connecting said second angled lever means to said helicoidal blades whereby when said ring means rotates said helicoidal blades pivot to change the direction of fluid flow to said turbine.

References Cited by the Examiner

UNITED STATES PATENTS

| 1,467,565 | 9/23 | Blair | 73—230 |
| 3,063,295 | 11/62 | Dowdell | 73—194 |

FOREIGN PATENTS

| 758,094 | 9/56 | Great Britain. |
| 828,093 | 2/60 | Great Britain. |

OTHER REFERENCES

Pages 11–13, Introduction to Gas Turbine and Jet-Propulsion Design, by Norman and Zimmerman, published by Harper in 1948.

RICHARD C. QUEISSER, *Primary Examiner.*

ROBERT L. EVANS, *Examiner.*